(12) United States Patent
Bohori et al.

(10) Patent No.: US 8,674,550 B2
(45) Date of Patent: Mar. 18, 2014

(54) CONTACTLESS POWER TRANSFER SYSTEM AND METHOD

(75) Inventors: Adnan Kutubuddin Bohori, Bangalore (IN); James William Bray, Niskayuna, NY (US); Somakumar Ramachandrapanicker, Bangalore (IN); Suma Memana Narayana Bhat, Bangalore (IN)

(73) Assignee: General Electric Company, Niskayuna, NY (US)

( * ) Notice: Subject to any disclaimer, the term of this patent is extended or adjusted under 35 U.S.C. 154(b) by 225 days.

(21) Appl. No.: 12/731,497

(22) Filed: Mar. 25, 2010

(65) Prior Publication Data

US 2011/0234010 A1    Sep. 29, 2011

(51) Int. Cl.
*H01F 27/42*    (2006.01)
*H01F 37/00*    (2006.01)
*H01F 38/00*    (2006.01)

(52) U.S. Cl.
USPC ........... 307/104; 307/149; 307/151; 320/108; 320/109; 333/219

(58) Field of Classification Search
USPC ........................................ 307/104, 149, 157
See application file for complete search history.

(56) References Cited

U.S. PATENT DOCUMENTS

| | | | |
|---|---|---|---|
| 6,960,968 B2 | 11/2005 | Odendaal et al. | |
| 7,323,964 B1 | 1/2008 | Shyu et al. | |
| 7,999,414 B2 | 8/2011 | Bruhn | |
| 2005/0087339 A1* | 4/2005 | Schultz et al. | 166/244.1 |
| 2008/0260323 A1* | 10/2008 | Jalali et al. | 385/12 |
| 2008/0265684 A1 | 10/2008 | Farkas | |
| 2009/0072629 A1 | 3/2009 | Cook et al. | |
| 2010/0148589 A1* | 6/2010 | Hamam et al. | 307/104 |
| 2010/0164296 A1* | 7/2010 | Kurs et al. | 307/104 |
| 2010/0171368 A1* | 7/2010 | Schatz et al. | 307/104 |
| 2010/0181843 A1* | 7/2010 | Schatz et al. | 307/104 |

FOREIGN PATENT DOCUMENTS

| | | |
|---|---|---|
| DE | 102007060811 A1 | 3/2009 |
| JP | 2008283584 A | 11/2008 |
| JP | 2009106136 A | 5/2009 |
| WO | 9850993 A1 | 11/1998 |
| WO | 2007008646 A2 | 1/2007 |

(Continued)

OTHER PUBLICATIONS

Aristeidis Karalis, J.D. Joannopoulos, Marin Soljac, Efficient wireless non-radiative mid-range energy transfer, Department of Physics, Massachusetts Institute of Technology, 77 Massachusetts Avenue, Cambridge, MA 02139, USA, accepted Apr. 17, 2007, Available online Apr. 27, 2007.

(Continued)

*Primary Examiner* — Rexford Barnie
*Assistant Examiner* — Toan Vu
(74) *Attorney, Agent, or Firm* — Ann M. Agosti (57) ABSTRACT

A contactless power transfer system is proposed. The system includes a first coil coupled to a power source and configured to produce a magnetic field. A second coil is configured to receive power from the first coil via the magnetic field. A field focusing element is disposed between the first coil and the second coil and configured as a self resonant coil having a standing wave current distribution. The field focusing element is further configured to focus the magnetic field onto the second coil and enhance the coupling between the first coil and the second coil.

19 Claims, 10 Drawing Sheets

(56) References Cited

FOREIGN PATENT DOCUMENTS

| WO | 2009009559 | A1 | 1/2009 |
|---|---|---|---|
| WO | 2009023646 | A2 | 2/2009 |
| WO | 2009140506 | A1 | 11/2009 |

OTHER PUBLICATIONS

Shahrzad Jalali Mazlouman, Alireza Mahanfar, Bozena Kaminska, Mid-range Wireless Energy Transfer Using Inductive Resonance for Wireless Sensors, Simon Fraser University.

A. Bohori et al., "Contactless Power Transfer System," U.S. Appl. No. 12/845,133, filed Apr. 28, 2011.

A, Bohori et al., "Contactless Power Transfer System," U.S. Appl. No. 13/096,372, filed Jul. 28, 2010.

S. P. Fenton et al., "Electrical Coupling Apparatus and Method," U.S. Appl. No. 12/778,475, filed May 12, 2010.

A. Bohori et al, "System and Method for Contactless Power Transfer in Portable Image Detectors," U.S. Appl. No. 13/149,170, filed May 31, 2011.

A.Bohori et al, "Contactless Power Transfer System," U.S. Appl. No. 12/820,208, filed Jun. 22, 2010.

A. Bohori et al.,"Systems for Contactless Power Transfer," U.S. Appl. No. 12/914,512, filed Oct. 28, 2010.

A. Bohori et al., "System and Method for Contactless Power Transfer in Implantable Devices," U.S. Appl. No. 13/052,196, filed Mar. 21, 2011.

A. Bohori et al., "Power Transfer System and Method," U.S. Appl. No. 12/822,232, filed Jun. 24, 2010.

Search Report and Written Opinion from corresponding EP Application No. 11159292.9-1806 dated Jun. 21, 2013.

\* cited by examiner

CONTACTLESS POWER TRANSFER SYSTEM AND METHOD

BACKGROUND

The invention relates generally to contactless power transfer and in particular, to resonance based contactless power transfer.

In certain applications where instantaneous or continuous energy transfer is needed but interconnecting wires are inconvenient, contactless power transfer is desirable. One contactless power transfer method is an electromagnetic induction method that works on the principle of a primary transformer coil generating a dominant magnetic field and a secondary transformer coil in the vicinity of the primary transformer coil generating a corresponding voltage. The magnetic field received by the secondary transformer coil decreases as a function of the square of the distance between the two coils, and hence the coupling between primary and secondary coils is weak for distances greater than a few millimeters.

Another method of contactless power transfer attempts to increase the efficiency of the inductive power transfer by resonant inductive coupling. Transmitter and receiver elements resonate at the same frequency, and maximum induction occurs at the resonant frequency. However, such resonant induction is sensitive to load and gap variations.

There is a need for an efficient contactless power transfer system that may operate with coils separated by longer distances than are presently acceptable and is efficient when subjected to misalignment or load variations.

BRIEF DESCRIPTION

Briefly, a contactless power transfer system is proposed. The system includes a first coil coupled to a power source and configured to produce a magnetic field. A second coil is configured to receive power from the first coil via the magnetic field. A field focusing element is disposed between the first coil and the second coil and configured as a self resonant coil having a standing wave current distribution. The field focusing element is further configured to focus the magnetic field onto the second coil and enhance the coupling between the first coil and the second coil.

In another embodiment, a field focusing element is proposed. The field focusing element includes a plurality of resonators configured to focus a magnetic field upon excitation and form a standing wave current distribution. A set of resonators among the plurality of resonators is excited in different phase than other resonators. The magnetic focusing element further comprises at least two unique resonant frequencies.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Contactless power transfer systems are typically characterized by short distance power transfer between primary and secondary coils. For example, one embodiment of an inductive power transfer system uses a primary coil and a secondary coil to transfer power between two circuits in galvanic isolation. A magnetic field is established around the primary coil when coupled to a power source. The quantity of power transferred from the primary coil to the secondary coil is proportional to the amount of primary magnetic field linking the secondary coil. Electrical transformers use high permeability magnetic cores to link the magnetic field between primary and secondary coils and thus achieve efficiencies of the order of at least about 98%. However, when such systems are configured for contactless power transfer, the air gap between the two coils reduces the magnetic field coupling. Such reduced coupling affects efficiency of contactless power transfer systems.

Certain embodiments disclosed herein provide a robust contactless power transfer system with reduced sensitivity to load variations, efficient power transfer during misalignment of coils, and/or a field focusing structure that enhances power transfer efficiency.

Figure 1:
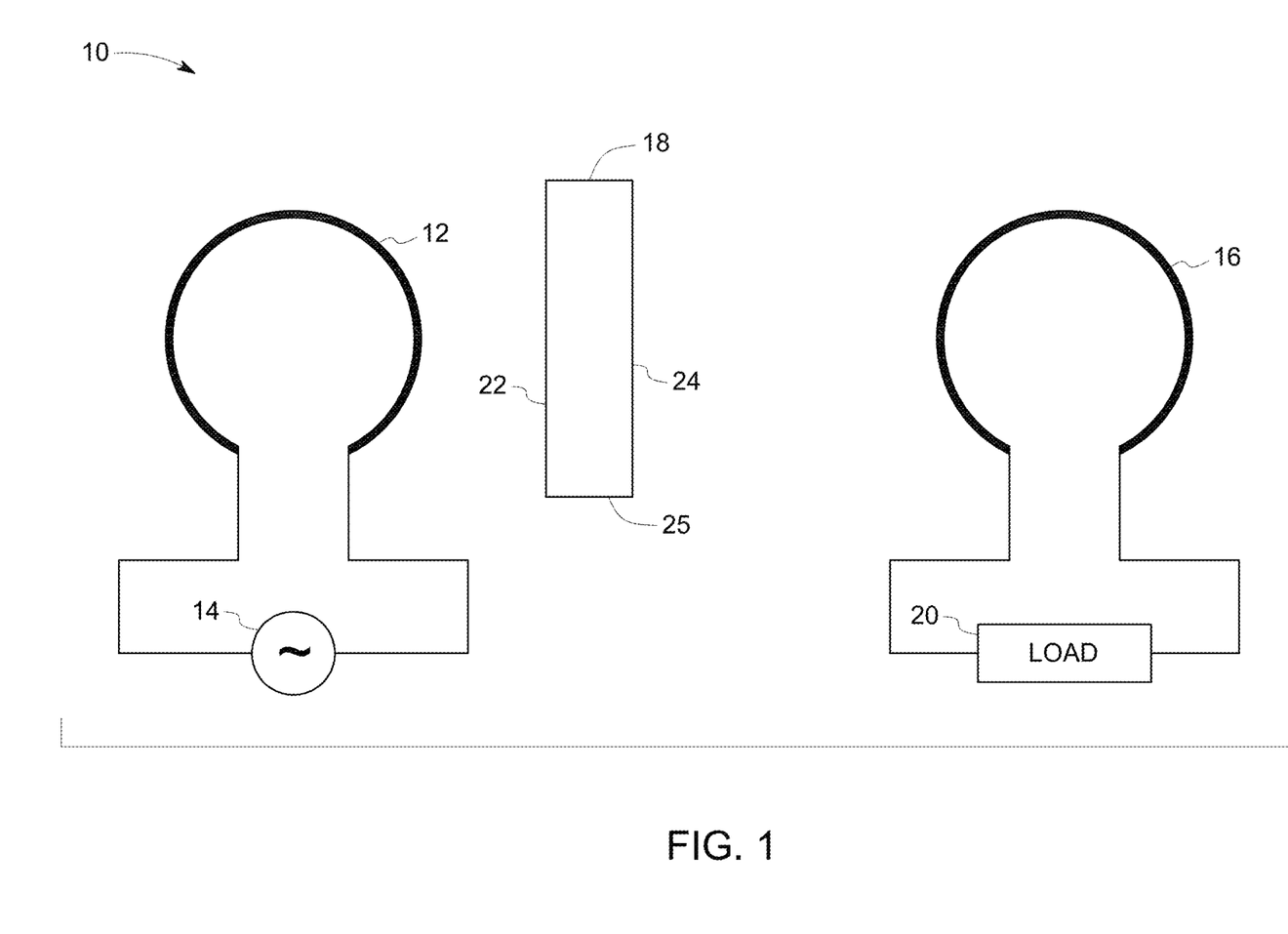
FIG. 1 illustrates an exemplary contactless power transfer system according to an embodiment of the invention.

FIG. 1 illustrates an exemplary contactless power transfer system 10 according to an embodiment of the invention including a first coil 12 coupled to a power source 14 and configured to produce a magnetic field (not shown). A second coil 16 is configured to receive power from the first coil 12. As used herein, the term "first coil" may also be referred to as a "primary coil," and the term "second coil" may also be referred to as a "secondary coil." Field focusing element 18 is disposed between the first coil 12 and the second coil 16 for focusing the magnetic field from power source 14. In another embodiment, the field focusing element may be used to focus electric fields and/or electro-magnetic fields. The terms "magnetic field focusing element" and "field focusing element" are used interchangeably. In one embodiment, magnetic field focusing element 18 is configured as a self resonant coil and has a standing wave current distribution when excited via the first coil. In another embodiment, magnetic field focusing element 18 is configured as a sub wavelength resonator. In yet another embodiment, the magnetic field focusing element includes multiple resonators operating as an active array or a passive array and each resonator configured as a self resonant coil with a standing wave current distribution. In yet another embodiment, the magnetic field focusing element includes multiple sets of such resonators, each such resonator set excited at a particular phase. It may be appreciated that, when exciting the sets of resonators via different phases, field focusing may be enhanced in a desired direction.

Magnetic field focusing element 18 is further configured to focus the magnetic field onto the second coil 16 enhancing the coupling between the first coil 12 and the second coil 16. In the illustrated embodiment, field focusing element 18 is placed closer to the first coil 12 as an example. It may be advantageous in certain systems to place the field focusing element 18 closer to the second coil 16. A load 20 is coupled to the second coil 16 to utilize the power transferred from the power source 14. In certain embodiments, the contactless power transfer system 10 may also be configured to simultaneously transfer power from the second coil to the first coil such that the system is capable of bidirectional power transfer. Non-limiting examples of potential loads include a bulb, a battery, a computer, a sensor, or any device that requires electrical power for operation.

The contactless power transfer system 10 may be used to transfer power from the power source 14 to the load 20. In one embodiment, the power source 14 comprises a single phase AC power generator or three phase AC power generator or a DC power generator in combination with power conversion electronics to convert the power to a higher frequency. When the first coil 12 is excited at the resonant frequency of magnetic field focusing element 18, a standing wave current distribution is developed within the magnetic field focusing element 18 between two open ends (22, 24) of the field focusing element. The standing wave current distribution leads to a non uniform magnetic filed distribution around magnetic field focusing element 18. Such non-uniform current distribution is configured to focus magnetic field in any desired direction, such as, in a direction of the second coil 16 in this example. When operating at resonant frequency, even a small excitation to magnetic field focusing element 18 produces a large amplitude of current distribution along the length 25 of the magnetic field focusing element. Large current magnitude of non-uniform distribution leads to an amplified and focused magnetic field in the direction of second coil 16 that results in higher efficiency of power transfer.

Figure 2:
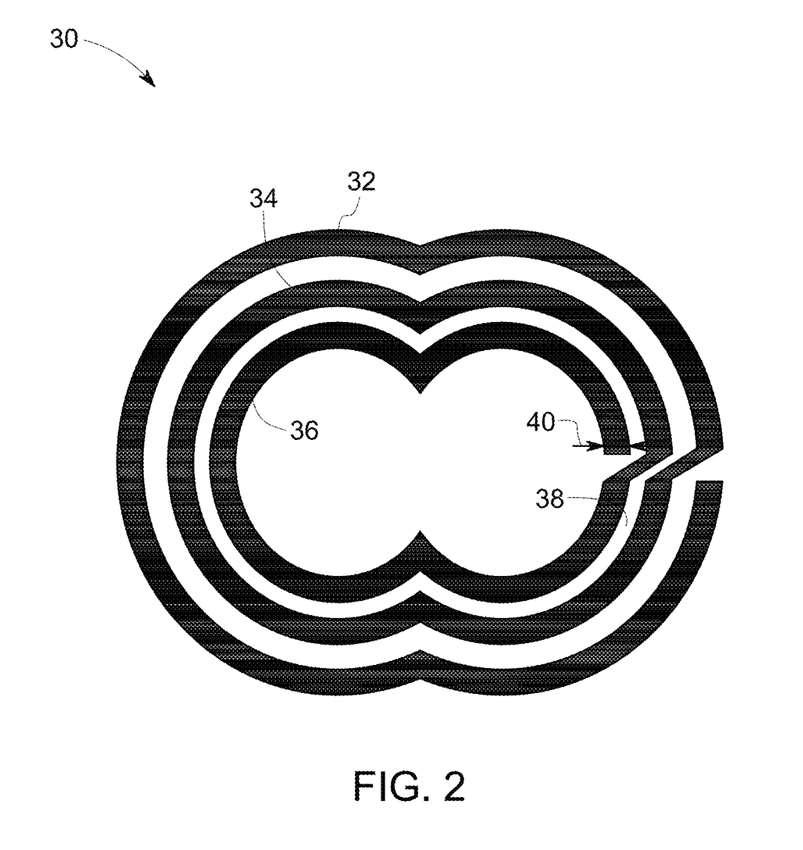
FIG. 2 illustrates an exemplary field focusing element according to an embodiment of the invention.

FIG. 2 illustrates an exemplary field focusing element according to an embodiment of the invention. Among the various structures that may be implemented as the magnetic field focusing element 18 in FIG. 1, one such structure is illustrated in FIG. 2. In the illustrated embodiment, the reference numeral 30 is a field focusing structure herein referenced as an "Omega structure" and operates in a range of a few megahertz. Such operating frequencies require high capacitance and inductance. The "Omega structure" enables high capacitance and inductance and also enables negative permeability at near resonant frequency. Negative permeability helps with dominant field response and is effective in controlling the magnetic field. Resonant frequency of such structures can be controlled by varying the number of turns (32, 34, 36), the gap between the turns (38), and the width of the spiral (40). With an increased perimeter as compared to a spiral structure, the "omega structure" requires reduced structural size to operate at lower resonance frequency.

Figure 3:
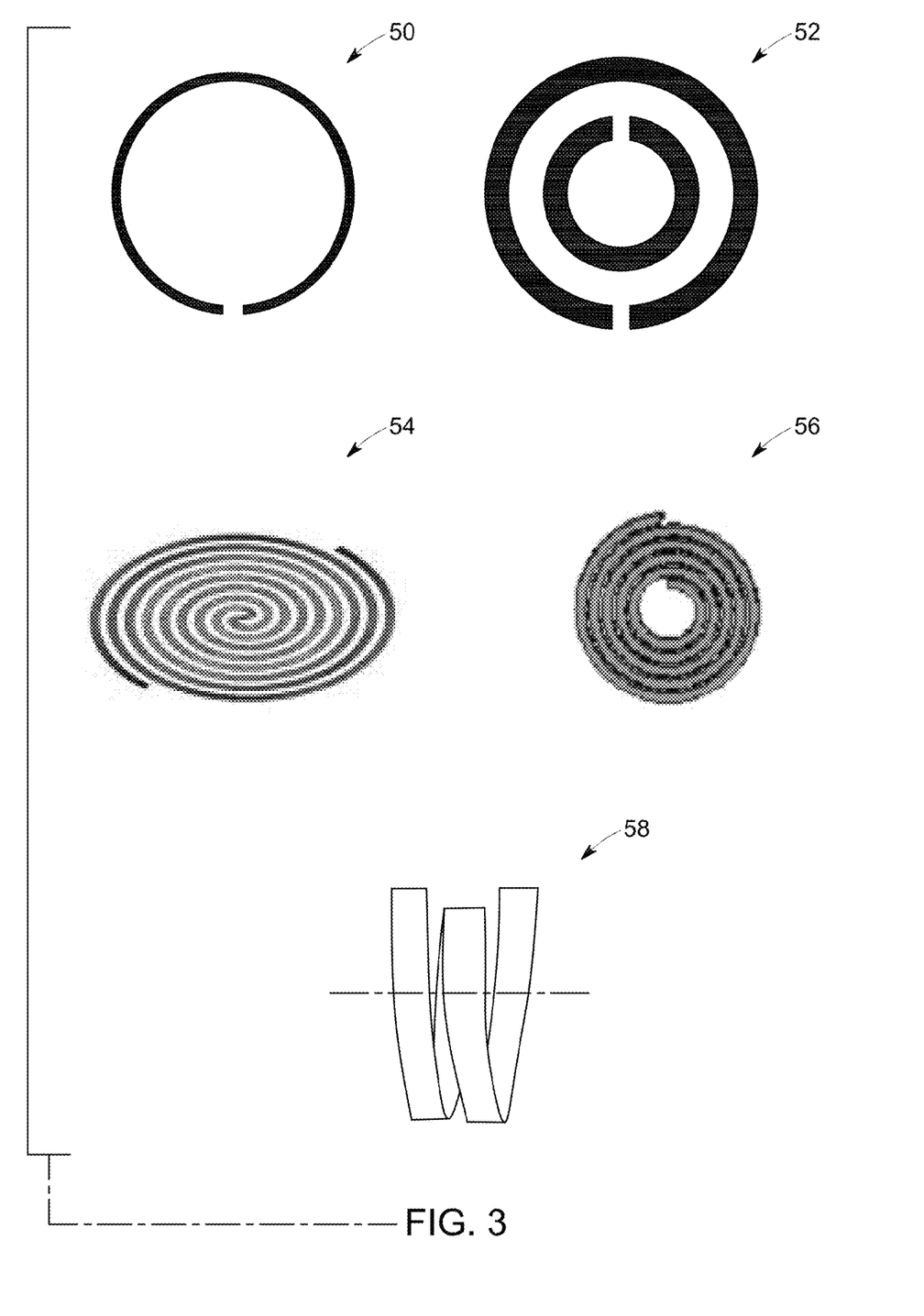
FIG. 3 illustrates multiple exemplary structures of field focusing elements according to various embodiments of the invention.

FIG. 3 illustrates multiple exemplary structures of field focusing elements according to various embodiments of the invention. In one embodiment, the field focusing element includes a single loop coil 50. In another embodiment, the field focusing element includes multiple turns such as in a split ring structure 52, spiral structure 54, Swiss-roll structure 56, or helical coil 58. Selection of a structure for a particular application is determined by the size and self-resonating frequency of the field focusing element. For example, in low power applications (less than about 1 Watt, for example), a resonance frequency up to about 1000 MHz is feasible. In high power applications (from about one hundred Watts to about 500 kilowatts, for example), the resonance frequency of the order of several hundred kHz is feasible. In certain applications, the choice of frequency and hence the design of the field focusing element is driven by the restrictions on human exposure to high frequency electric and magnetic fields.

Swiss-roll coil 56 may be used to provide a compact resonator that may be configured to operate at frequencies from about 100 kHz up to about 100 MHz. Swiss-Roll embodiments may be used to provide extended magnetic field focusing strength and help achieve increased capacitance and inductance and hence a compact design due to size reduction in the spatial structure of the coils. A single Swiss Roll resonator is expected to be capable of focusing a magnetic field up to few inches of distance.

A helical structure is a wire wound in the form of a helix. Helical structure 58, when used as magnetic field focusing element, can achieve high Q factor. In one embodiment, coating the surface of the conductor in the helical structure with high conductivity material helps minimize skin effects in the magnetic field focusing element at high frequencies and hence enables the higher Q factor. Helical resonators are analogous to an array of dipoles and loops. Helical structures are designed for focusing magnetic field in an axial direction by optimizing the pitch and number of turns.

Figure 4:
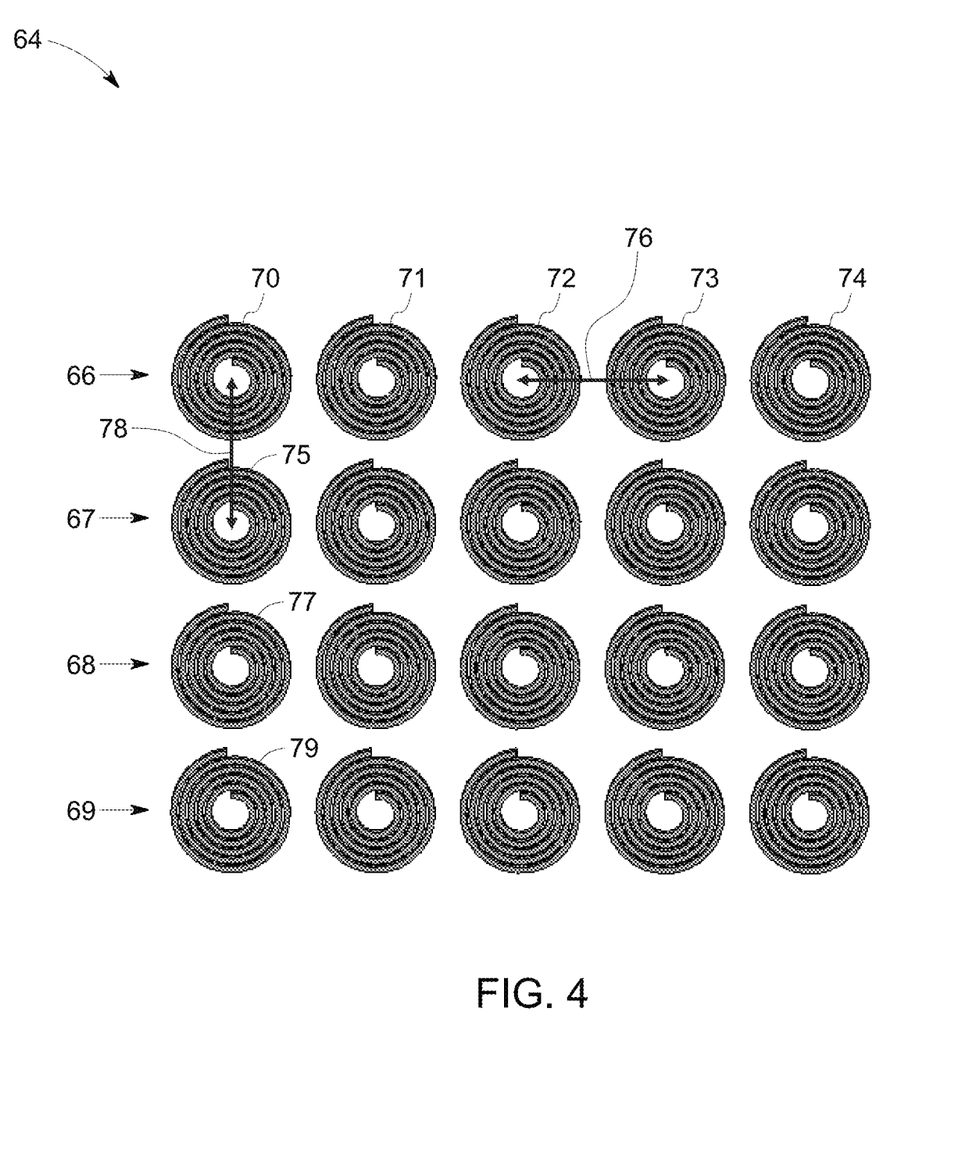
FIG. 4 illustrates an embodiment wherein a plurality of resonators are arranged in an array and implemented as a field focusing element.

FIG. 4 illustrates an embodiment wherein a plurality of resonators are arranged in an array and implemented as a field focusing element. An array of resonators constitutes multiples resonator coils arranged in particular array arrangement, such as a linear or planar array, that is excited with a specific phase relationship. Individual resonators (66-77) or sub wavelength resonators are configured to focus the magnetic field in a desired direction. In such an arrangement, fields from resonators in the array interfere constructively (add) in a desired direction to achieve magnetic field focusing and interfere destructively (cancel each other) in the remaining space. In another embodiment, the resonators are arranged in at least one of a linear, a circular, a planar, or a three-dimensional array. In the illustrated embodiment, individual resonators 70-74 are arranged in a row and four such rows 66-69 are arranged one below the other. Individual resonators that are part of the array 64 are collectively configured for at least one or more resonant frequencies. In a particular embodiment, all of the individual resonators of the array are identical.

In another embodiment, a few individual resonators, for example resonators 70-74 are excited at different phases such that field focus is achieved in desired direction. Further sets of resonators for example, 70, 75-79 may have a particular phase configuration. In any of these embodiments, the total field of the array 64 is determined by the vector addition of the fields from individual resonators. When parameters of the individual resonators or of the resonator sets are varied, such variations may be selected to shape the overall field pattern of the array. Different ways to provide variation include, for example, geometrical configurations (linear, circular, rectangular, spherical, etc.), relative displacement between the resonators (76, 78), excitation amplitude of the individual resonators, excitation phase of the individual resonators, and relative pattern of the individual resonators.

In yet another embodiment, one set of resonators, for example 66 is configured for one particular resonance frequency and another set of resonators 67 is configured for another resonance frequency. In such a configuration, power may be transferred through the first set of resonators 66 and data on the second set of resonators 67. Alternatively, bi-directional power may be transferred using the array 64. For example, power is transferred in one direction via resonator set 66 and power in opposite direction is transferred via set 67 simultaneously.

Various excitation schemes may be implemented on individual resonators of the array. One such example includes exciting all the individual resonators in the array to form an active array. Amplitude and phase of the excitation on each resonator may be controlled to change the direction of a respective magnetic beam to achieve active beam steering.

In another embodiment, a single resonator may be excited while the other resonators are electromagnetically coupled to the excited resonator to form a passive array. Such passive arrays generate an elongated magnetic field focusing beam that enables power transfer efficiently up to a few meters of distance.

In another embodiment, the array includes individual resonator of the sub-wavelength dimension forming a passive structure. None of the resonators are specifically excited. However, when they are placed near magnetic field, the array will focus the magnetic field. Spatial disposition of such passive structures are designed to result in effective negative permeability.

If desired, a resonator or an array of resonators can be embedded in a material having high dielectric constant (dielectric permittivity) or a magnetic material having high permeability or magneto-dielectric medium having high dielectric permittivity and high permeability to achieve lower resonant frequency with a smaller sized resonator. High permeability material enhances self-inductance of the resonator and high permittivity material enhances self-capacitance of the resonators to reduce the frequency of resonance. In another embodiment, high permeability materials are also configured to increase the coupling between the primary coil, the field focusing element, and the secondary coil. Materials such as but not limited to barium strontium titanate are an example of materials exhibiting high dielectric constant.

Figure 5:
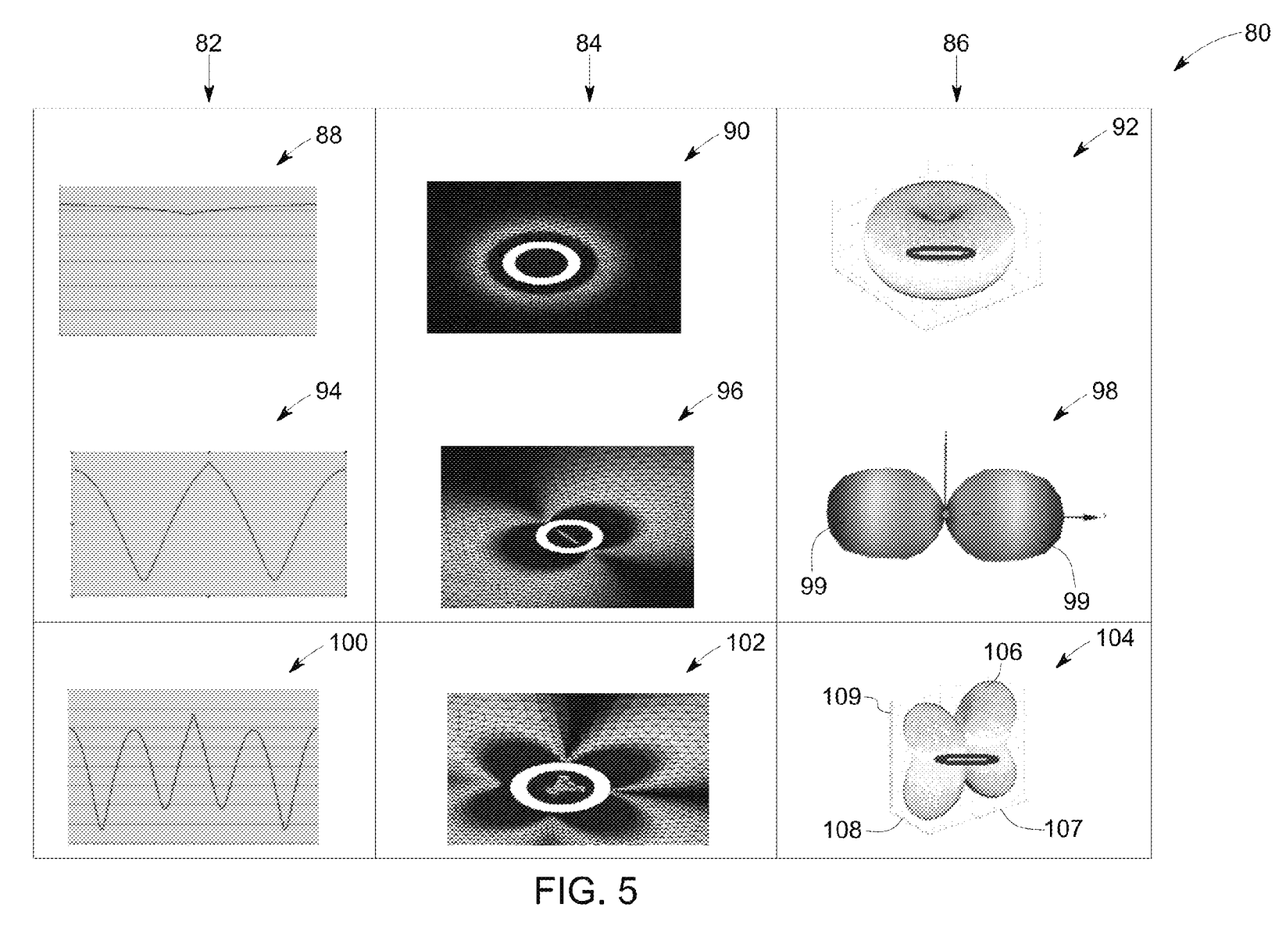
FIG. 5 illustrates a magnetic field distribution around the field focusing element according to an embodiment of the invention.

FIG. 5 illustrates a magnetic field distribution around the field focusing element according to an embodiment of the invention. Various plots as referenced by the numeral 80 include column 82 which depicts current distribution within the magnetic field focusing element, column 84 which depicts corresponding two-dimensional magnetic field plots and column 86 which illustrates corresponding three-dimensional magnetic field plots. Plots illustrated herein were obtained during a simulation that included an exemplary single loop (turn) resonator as a field focusing element having varying current distribution. For example, a uniform current distribution 88 within the field focusing element operating at non self-resonating frequency would result in uniform magnetic field distribution 90 (corresponding three-dimensional illustration in 92) and would not lead to any field focusing. However, when the field focusing element is excited to one full cycle of standing wave current distribution as indicated by reference numeral 94, at least two lobs of magnetic field distribution result when operating at a self-resonant frequency, as illustrated by the reference numeral 96. As will be clearer in the corresponding three dimensional graph 98, field focus is achieved along an axial direction 99. In another embodiment, when the field focusing element is excited to multiple cycles of standing wave current distribution, for example two cycles, as indicated by reference numeral 100, a magnetic field distribution as illustrated by reference numeral 102 results. Multiple lobs of the magnetic field such as 106-108 are achieved when operating at self-resonant frequency, as illustrated by the reference numeral 104. Depending on the contactless power transfer requirement a particular scheme may be implemented. For example, a contactless power transfer system having one primary coil transferring power to one secondary coil may implement one full cycle of standing wave current distribution within the magnetic field focusing element. A contactless power transfer system having one primary coil transferring power to two or more secondary coils may implement multiple cycles of standing wave current distribution within the magnetic field focusing element.

Changing the current distribution (88, 94, 100) in the field focusing element alters the magnetic field distribution (92, 98, 104). Therefore current distribution within the coils of the magnetic field focusing element determines the magnetic field distribution. As discussed earlier, other factors influencing the magnetic field distribution include geometry of the coils and special arrangement of resonators in an array.

Figure 6:
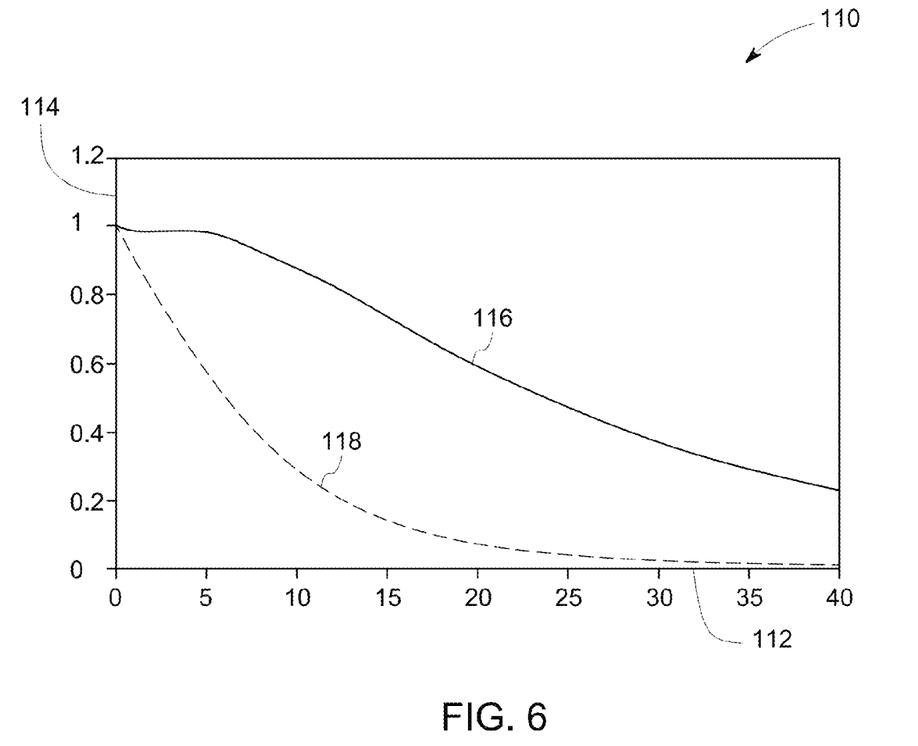
FIG. 6 is a simulation of a magnetic field profile as a function of distance between primary coil and secondary coils.

FIG. 6 is a simulation of a magnetic field profile as a function of distance between primary coil and secondary coils. In the illustrated embodiment, graph 110 represents distance measured in millimeters between the coils on the abscissa 112 and the normalized magnetic field strength on the ordinate 114. Profile 116 illustrates variation of magnetic field strength in a contactless power transfer system implementing a magnetic field focusing element such as discussed in FIG. 1. Profile 118 represents variation of magnetic field strength in a typical inductive contactless power transfer system that does not implement a magnetic field focusing element. Magnetic field strength at a distance of about 17 mm between the coils is about 0.7 units in the system implementing a magnetic field focusing element and only about 0.1 units in a typical inductive contactless power transfer system. The magnetic field focusing element enhances the magnetic field strength by at least about 15% to about 30% for the same distance between coils. Such enhanced field strength improves efficiency of the overall power transfer and enables the system to be more robust to misalignment between primary and secondary coils.

Figure 7:
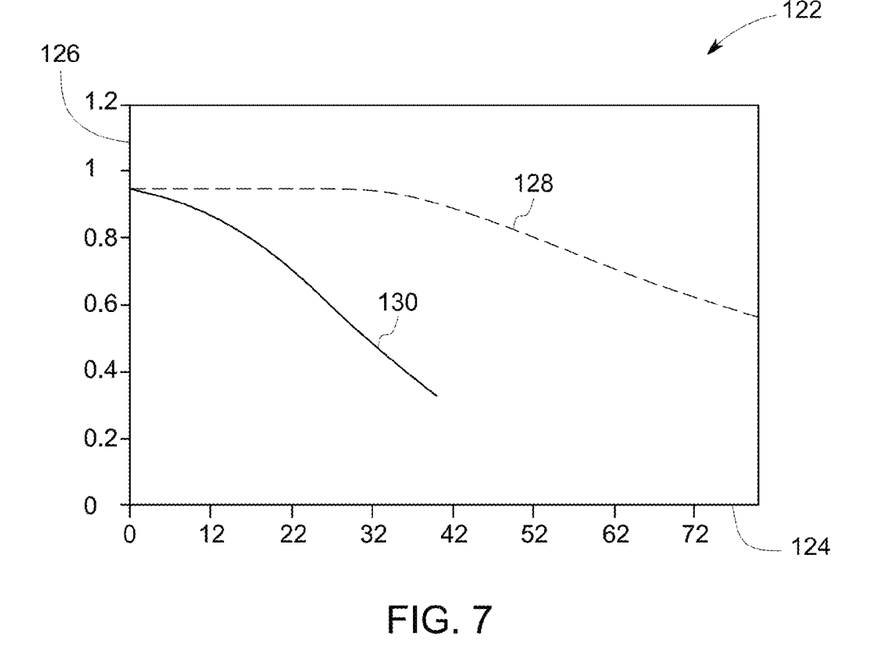
FIG. 7 illustrates a simulation of an efficiency profile as a function of distance between primary and secondary coils.

FIG. 7 illustrates a simulation of an efficiency profile as a function of distance between primary and secondary coils. In the illustrated embodiment, graph 122 represents distance measured in millimeters between the coils on the abscissa 124 the and efficiency on the ordinate 126. Profile 128 illustrates a variation of efficiency in a contactless power transfer system implementing a magnetic field focusing element such as discussed in FIG. 1. Profile 130 represents variation of efficiency in a typical inductive contactless power transfer system that does not implement a magnetic field focusing element. Efficiency of the contactless power transfer system at a distance of about 32 mm between the coils is about 95% in the system implementing a magnetic field focusing element. However, at the same distance of about 32 mm between the coils, the efficiency of power transfer is about 55% in a typical inductive contactless transfer system. The magnetic field focusing element enhances the efficiency by at least about 40% to about 50% for the same distance between coils.

Figure 8:
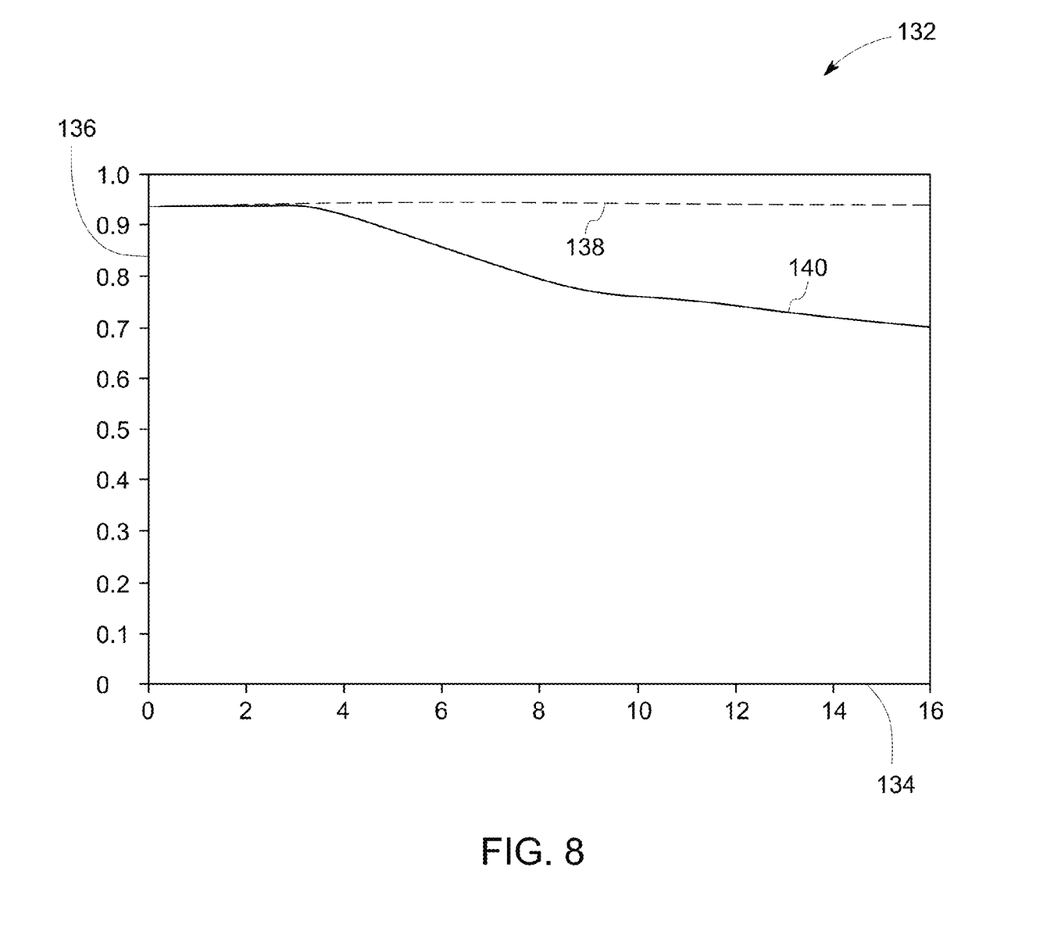
FIG. 8 illustrates a simulation of efficiency profile as a function of misalignment between the primary coil and the secondary coil.

FIG. 8 illustrates a simulation of efficiency profile as a function of misalignment between the primary coil and the secondary coil. In the illustrated embodiment, graph 132 represents misalignment between the coils measured in millimeters on the abscissa 134 and efficiency on the ordinate 136. Profile 138 illustrates a variation of efficiency in a contactless power transfer system implementing a magnetic field focusing element such as discussed in FIG. 1. Profile 140 represents variation of efficiency in a typical inductive contactless power transfer system that does not implement a magnetic field focusing element. Efficiency of the contactless power transfer system for a misalignment of about 14 mm between the coils is about 95% in the system implementing a magnetic field focusing element. However, for the same misalignment of about 14 mm between the coils, the efficiency of typical contactless inductive power transfer is about 72%. As evident from the illustrated profile, magnetic field focusing element enhances the efficiency during misalignment.

Figure 9:
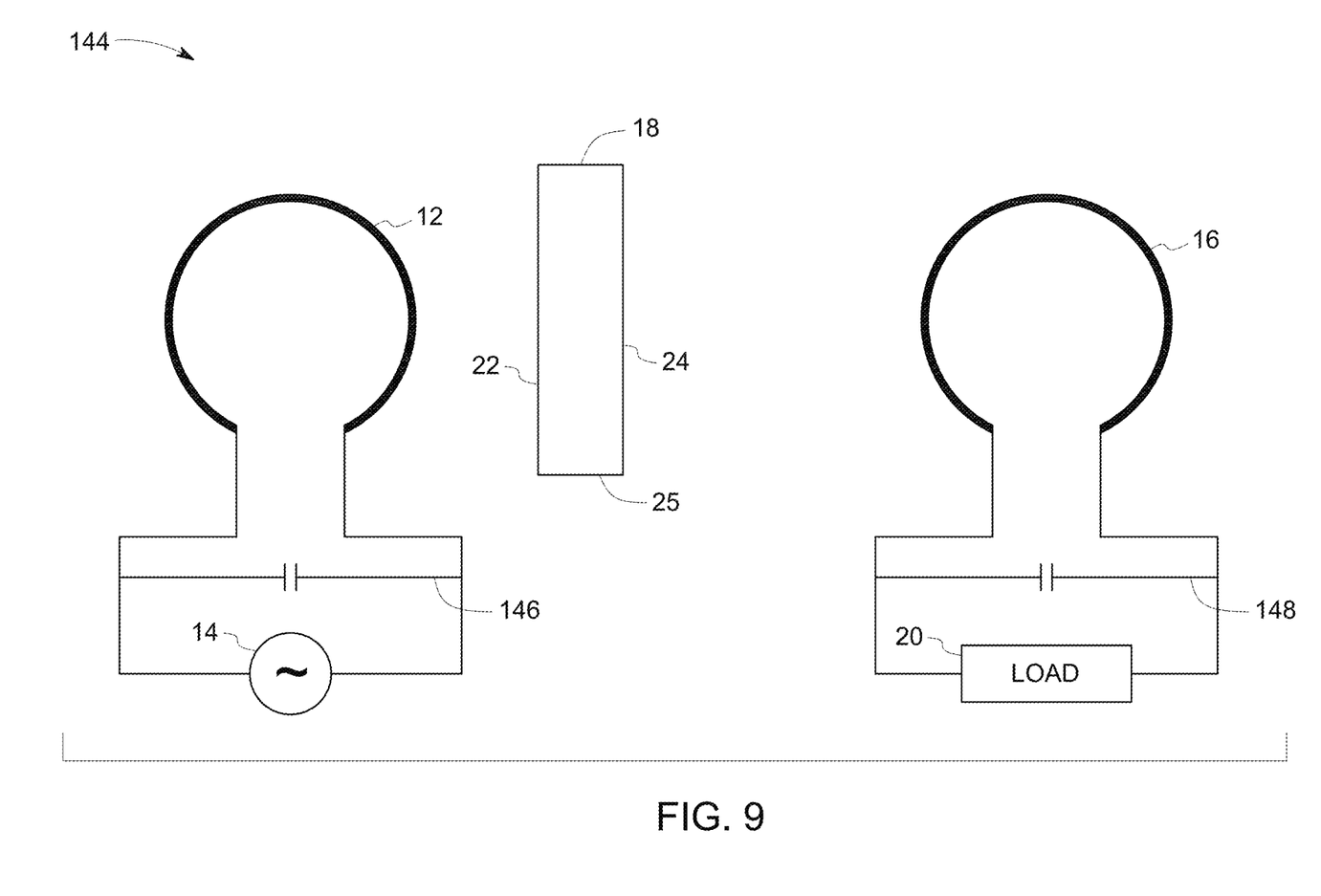
FIG. 9 illustrates an embodiment of the invention wherein the contactless power transfer system includes capacitive elements.

FIG. 9 illustrates an embodiment of the contactless power transfer system that includes capacitive elements. The contactless power transfer system 144 includes at least one capacitive element coupled to each of the first coil and the second coil. Capacitive elements 146, 148 form a tuned resonance circuit with the first coil 12 and the second coil 16 that results in the first coil, the second coil, and the magnetic field focusing element 18 resonating at the same resonant frequency.

Figure 10:
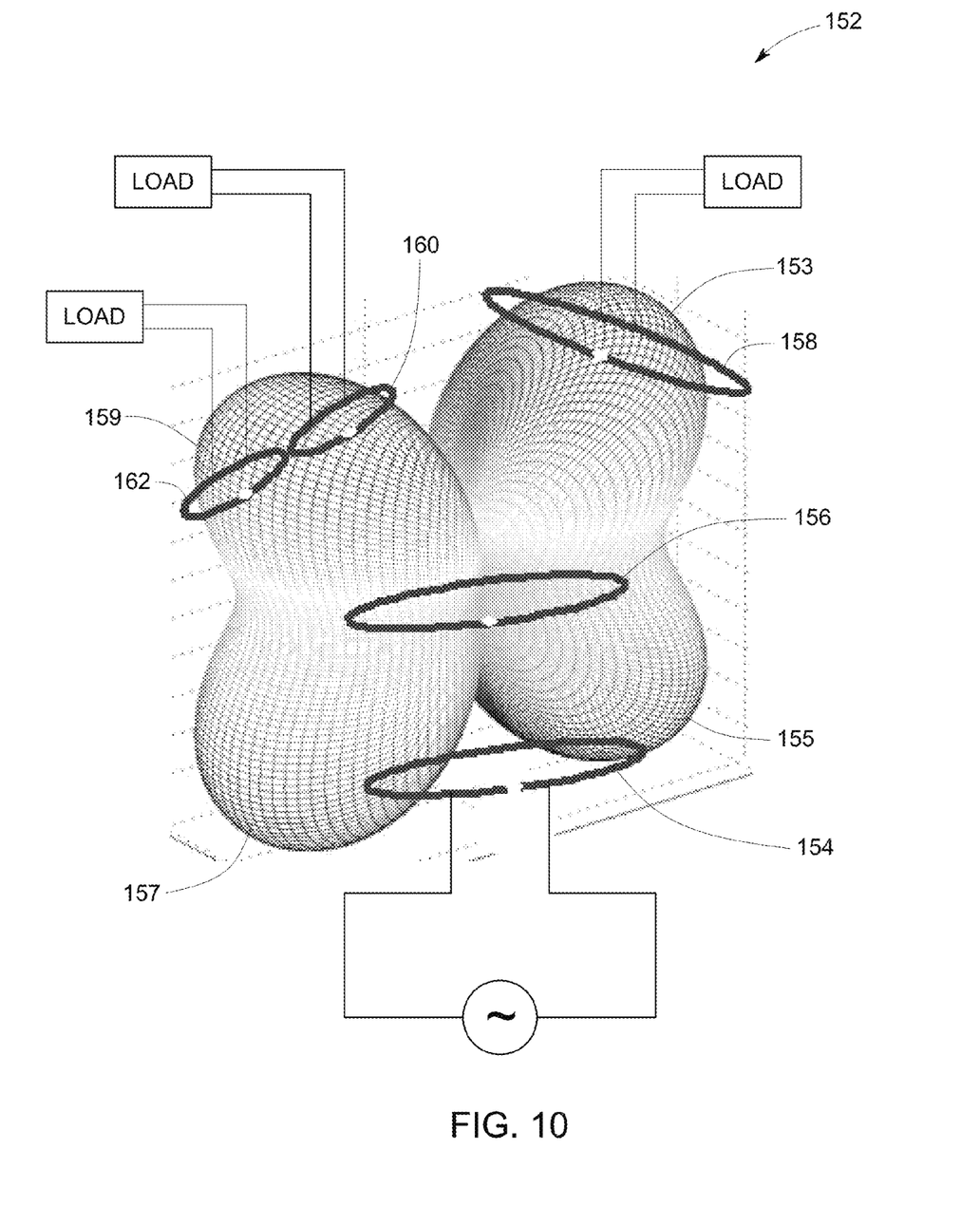
FIG. 10 illustrates an embodiment of the invention wherein the field focusing element couples a single primary coil to a plurality of secondary coils.

FIG. 10 illustrates an embodiment wherein the field focusing element couples a single primary coil to a plurality of secondary coils. For example, the field focusing element 156 exhibits multiple lobes (153, 155, 157, 159) of magnetic field distribution when subjected to multiple cycle current distribution (as illustrated by the numeral 100 in FIG. 5.) In the illustrated embodiment the contactless power transfer system 152 includes field focusing element 156 configured to couple one first coil 154 and at least two or more second coils 158-162. The second coils 158-162 are individually coupled to various loads. Such a configuration enables transferring power form one power source to multiple loads simultaneously.

Figure 11:
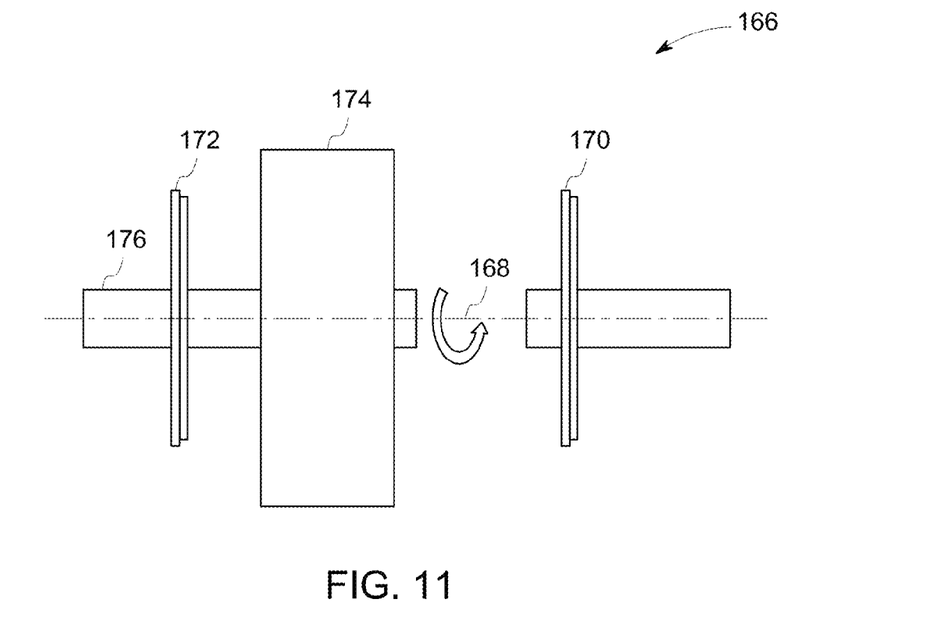
FIG. 11 illustrates an embodiment according to the invention, wherein at least one of the coils and/or the field focusing element is rotating along an axis of symmetry.

FIG. 11 illustrates an embodiment wherein at least one of the coils and/or the field focusing element is rotating along an axis of symmetry. Contactless power transfer system 166 includes an axis of rotation 168 along which at least one or all of the first coil 170, the second coil 172, and the field focusing element 174 are configured to rotate. In the illustrated embodiment, the first coil 170 is fixed and the second coil 172 and field focusing element 174 are mounted on a rotating shaft 176. In one embodiment, during an operation, the rotating magnetic field focusing element 174 is configured to focus the field along the axis of rotation coupling the stationary first coil 170 and the rotating second coil 172.

Figure 12:
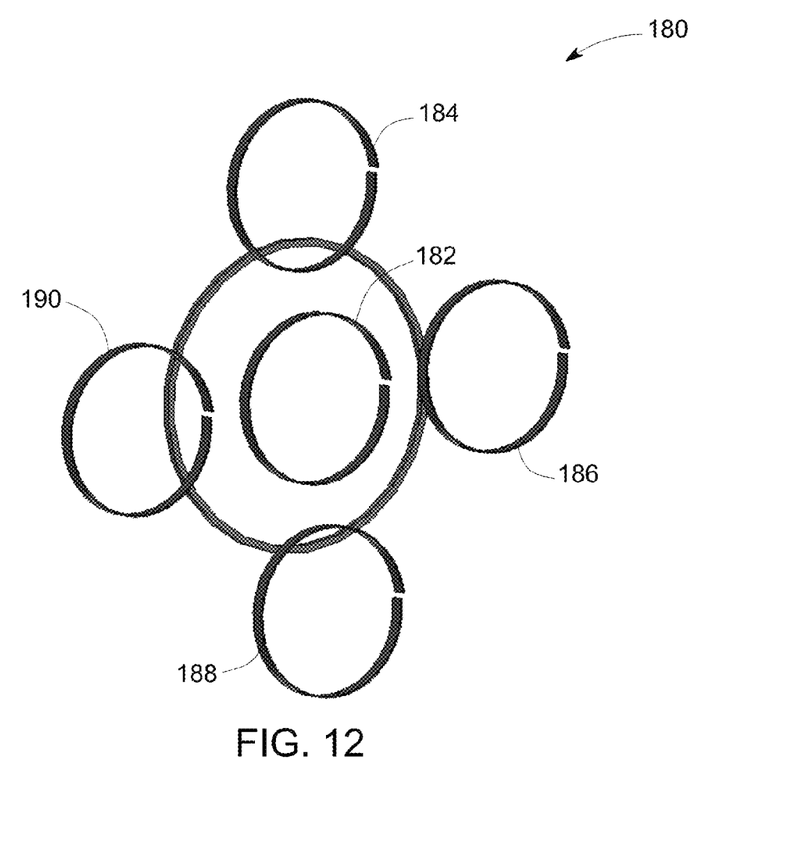
FIG. 12 illustrates a passive array of resonators according to an embodiment of the invention.

FIG. 12 illustrates a passive array of resonators according to an embodiment of the invention. Array of resonators 180 includes multiple individual resonators 182-190 such that each resonator is configured to have different standing wave current distribution, for example, half cycle, one full cycle, or multiple cycles. In an exemplary embodiment, resonator 182 is configured to have multiple cycle current distribution at resonant frequency to produce four lobes of magnetic field distribution as discussed earlier in FIG. 10. Accordingly four resonators 184-190 are placed around resonator 182 such that each resonator 184-190 is magnetically coupled to the central resonator 182. Resonators 184-190 are further configured to have single cycle current distribution at the same resonant frequency such that vector sum of these four fields would be an enhanced magnetic field focused in an axial direction 192.

Advantageously, contactless power transfer systems as disclosed in certain embodiments herein are configured to include field focusing elements and are less sensitive to the variations in the load as the frequency of resonance of such a systems are determined by the structure of field focusing element and independent of the circuit and load parameters in the primary and secondary coils. Efficiency of a typical resonant inductive coupling based contactless power transfer system is sensitive to variations in load. As the load varies in such inductive systems, resonance frequency of the secondary circuit is altered and causes impedance mismatch resulting in reduced power transfer capability and efficiency. As described herein, field focusing element may be used for enhancing magnetic field focus and efficiency of the contactless power transfer system. Further a single resonator or an array of resonators as discussed earlier may include multiple resonance frequencies to enable the transfer of power and/or data at both or the either of the resonance frequencies. For example, one frequency may be used to transfer the power from the primary coil to the secondary coil to energize the equipment connected to secondary coil and another frequency may be used to transmit a data signal between the primary coil and secondary coil. Power and data transmission can be achieved simultaneously across the primary coil, field focusing element, and secondary coil.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A contactless power transfer system comprising:
a first coil coupled to a power source and configured to produce a magnetic field;
a second coil configured to receive power from the first coil via the magnetic field; and
a field focusing element disposed between the first coil and the second coil comprising a plurality of resonators arranged in an array, wherein each of the plurality of resonators is configured to be excited by the first coil and upon excitation, the plurality of resonators interfere constructively in a direction of the second coil and interfere destructively in a remaining space to focus the magnetic field onto the second coil and enhance the coupling between the first coil and the second coil.

2. The contactless power transfer system of claim 1, further comprising two or more second coils configured to receive power from the first coil.

3. The contactless power transfer system of claim 1, wherein the second coil is further coupled to a power load.

4. The contactless power transfer system of claim 1, wherein the plurality of resonators comprise two or more resonant frequencies.

5. The contactless power transfer system of claim 4, wherein two or more resonant frequencies are configured to simultaneously transfer power and data signals.

6. The contactless power transfer system of claim 1, wherein the resonators are disposed within at least one of a dielectric medium, a magnetic medium, or a magneto-dielectric medium.

7. The contactless power transfer system of claim 1, wherein the field focusing element is configured for bi-directional power transfer.

8. The contactless power transfer system of claim 1, wherein the magnetic field focusing element comprises at least two sets of resonators.

9. The contactless power transfer system of claim 8, wherein each of the at least two sets of resonators comprises a unique resonant frequency.

10. The contactless power transfer system of claim 8, wherein the magnetic field focusing element is configured to transfer power simultaneous at two or more unique frequencies.

11. The contactless power transfer system of claim 1, wherein at least one of the first coil, the second coil, or the field focusing element is configured to rotate with respect to each other along an axis of rotation.

12. The contactless power transfer system of claim 11, wherein the field focusing element is further configured to focus the magnetic field along the axis of rotation.

13. The contactless power transfer system of claim 1 further comprising at least one capacitive element coupled to each of the first coil and the second coil, wherein the capacitive element is tuned to resonate with the field focusing element.

14. The contactless power transfer system of claim 1, wherein the field focusing element is further configured to focus at least one of an electric field, a magnetic field, or an electromagnetic field.

15. The contactless power transfer system of claim 1, wherein the plurality of resonators comprise at least one of a single turn coil, multiple turn coil, or a helical coil.

16. The contactless power transfer system of claim 1, wherein the plurality of resonators comprise at least one of a spiral structure, a split ring structure, or a Swiss-roll structure.

17. The contactless power transfer system of claim 1, wherein the plurality of resonators form a standing wave current distribution wherein the current distribution within the resonators shapes the magnetic field distribution.

18. The contactless power transfer system of claim 1, wherein the plurality of resonators are configured to shape the magnetic field.

19. The contactless power transfer system of claim 1, wherein the array comprises a linear, a planar, a circular or a three-dimensional structure.

* * * * *

UNITED STATES PATENT AND TRADEMARK OFFICE
CERTIFICATE OF CORRECTION

| | | |
|---|---|---|
| PATENT NO. | : 8,674,550 B2 | Page 1 of 1 |
| APPLICATION NO. | : 12/731497 | |
| DATED | : March 18, 2014 | |
| INVENTOR(S) | : Bohori et al. | |

It is certified that error appears in the above-identified patent and that said Letters Patent is hereby corrected as shown below:

In the Specification

In Column 3, Line 37, delete "magnetic filed" and insert -- magnetic field --, therefor.

In Column 6, Line 49, delete "the and" and insert -- and the --, therefor.

Signed and Sealed this
Tenth Day of June, 2014

Michelle K. Lee
*Deputy Director of the United States Patent and Trademark Office*